United States Patent
Abe et al.

(10) Patent No.: US 9,574,062 B2
(45) Date of Patent: *Feb. 21, 2017

(54) CHLOROPRENE RUBBER COMPOSITION AND VULCANIZED RUBBER THEREOF, AND RUBBER MOLDED PRODUCT, VIBRATION-DAMPING RUBBER MEMBER, ENGINE MOUNT, AND HOSE USING VULCANIZED RUBBER

(75) Inventors: Yasushi Abe, Itoigawa (JP); Hiroyuki Ishiguro, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 538 days.

This patent is subject to a terminal disclaimer.

(21) Appl. No.: 14/003,590

(22) PCT Filed: Feb. 22, 2012

(86) PCT No.: PCT/JP2012/054197
§ 371 (c)(1),
(2), (4) Date: Sep. 6, 2013

(87) PCT Pub. No.: WO2012/124442
PCT Pub. Date: Sep. 20, 2012

(65) Prior Publication Data
US 2013/0344269 A1    Dec. 26, 2013

(30) Foreign Application Priority Data

Mar. 11, 2011  (JP) ................. 2011-053862

(51) Int. Cl.
| | | |
|---|---|---|
| C08K 3/04 | (2006.01) | |
| C08F 36/18 | (2006.01) | |
| B32B 1/00 | (2006.01) | |
| B32B 1/08 | (2006.01) | |
| C08K 5/3445 | (2006.01) | |
| C08K 5/00 | (2006.01) | |
| C08K 5/11 | (2006.01) | |
| C08K 5/3447 | (2006.01) | |

(52) U.S. Cl.
CPC . *C08K 3/04* (2013.01); *B32B 1/00* (2013.01); *B32B 1/08* (2013.01); *C08F 36/18* (2013.01); *C08K 5/0016* (2013.01); *C08K 5/11* (2013.01); *C08K 5/3445* (2013.01); *C08K 5/3447* (2013.01); *Y10T 428/1372* (2015.01); *Y10T 428/1386* (2015.01)

(58) Field of Classification Search
CPC .............. C08K 5/11; C08K 3/04; B32B 1/00; B32B 1/08; C08F 36/18; C08F 2/38; Y10T 428/1372
See application file for complete search history.

(56) References Cited

U.S. PATENT DOCUMENTS

| | | | |
|---|---|---|---|
| 4,975,139 A | 12/1990 | Sugimoto | .................. 156/307.1 |
| 8,530,547 B2* | 9/2013 | Abe | ........................ C08F 36/18 524/106 |
| 2005/0131156 A1* | 6/2005 | Sawada | .................. C08L 13/00 525/233 |
| 2010/0209644 A1 | 8/2010 | Abe et al. | .................... 428/36.9 |

FOREIGN PATENT DOCUMENTS

| | | |
|---|---|---|
| CN | 101796123 A | 8/2010 |
| EP | 1 148 094 A1 | 10/2001 |
| EP | 1 795 341 A1 | 6/2007 |
| JP | 63-256637 A | 10/1988 |
| JP | 1-320153 A | 12/1989 |
| JP | 06-079828 A | 3/1994 |
| JP | 08-127673 A | 5/1996 |
| JP | 09-295371 A | 11/1997 |
| JP | H 11-209635 A | 8/1999 |
| JP | 2005-60581 A | 3/2005 |
| WO | WO 2006/035892 A1 | 4/2006 |
| WO | WO 2009/035109 A1 | 3/2009 |

OTHER PUBLICATIONS

International Search Report mailed Mar. 19, 2012, issued in corresponding International Patent Application No. PCT/JP/2012/054197.
European Search Report dated Aug. 6, 2014 issued to European Application No. 12758135.3.

* cited by examiner

*Primary Examiner* — Walter B Aughenbaugh
(74) *Attorney, Agent, or Firm* — Stein IP, LLC

(57) ABSTRACT

The invention provides compositions of chloroprene rubbers having improved vibration-damping properties under low temperature conditions without deterioration of mechanical properties, permanent compression set and tension fatigue in the final product. The chloroprene rubbers of the invention contain a xanthogen-modified chloroprene rubber and/or a mercaptan-modified chloroprene rubber in an amount of 100 parts by mass, a carbon black having an average particle diameter of 70 mn to 600 mn and a DBP oil absorption (as determined by Absorption A method of JIS-K6221) of 15 ml/100 g in an amount of 15 to 150 parts by mass, and a plasticizer represented by the chemical formula $R_1COO-(CH_2)_8-COOR_2$ wherein $R_1$ and $R_2$ each represent an alkyl group having 1 to 7 carbons.

13 Claims, No Drawings

CHLOROPRENE RUBBER COMPOSITION AND VULCANIZED RUBBER THEREOF, AND RUBBER MOLDED PRODUCT, VIBRATION-DAMPING RUBBER MEMBER, ENGINE MOUNT, AND HOSE USING VULCANIZED RUBBER

CROSS-REFERENCE TO RELATED APPLICATIONS

This application is a national stage application of PCT Application No. PCT/JP2012/054197, filed on Feb. 22, 2012, which claims the benefit of Japanese Application No. 2011-053862, filed Mar. 11, 2011, in the Japanese Patent Office. All disclosures of the document(s) named above are incorporated herein by reference.

BACKGROUND OF THE INVENTION

1. Field of the Invention

The present invention relates to a chloroprene rubber composition. More specifically, it relates to a chloroprene rubber composition comprising a particular chloroprene rubber, a particular carbon black at a particular rate, and a plasticizer having a particular structure at a particular rate, a vulcanized rubber prepared by vulcanizing the chloroprene rubber composition as well as a rubber molded product, a vibration-damping rubber member, an engine mount, and a hose prepared using the vulcanized rubber.

2. Description of the Related Art

Chloroprene rubbers that are superior for example in mechanical properties, weather resistance, and flame resistance have been used widely as materials for industrial rubber products. The properties required for such industrial rubber products are becoming severer drastically and thus, there is a need for chloroprene rubbers showing improved vibration-damping properties under low-temperature environment, while preserving the properties such as mechanical properties, weather resistance, and flame resistance.

Known as a means of producing a high damping material composition with smaller change over time that contains chloroprene as the base polymer is a method of blending a compound having ester bonds with a base polymer (see, for example, Patent Document 1). The method of Patent Document 1 is a method permitting cost-effective production of a high damping material composition that shows favorable damping properties in a wide range of temperature and smaller change over time by blending a compound having two or more ester bonds in the molecule with a base polymer having polar groups or polar side chains.

CITATION LIST

Patent Literature

[Patent Document 1] JP-A No. H11-209635

SUMMARY OF THE INVENTION

Technical Problem

A main object of the present invention is to provide a technology for improving the vibration-damping properties of chloroprene rubbers under low-temperature environment without deterioration of the mechanical properties, permanent compression set, and tension fatigue.

Solution to Problem

After intensive studies on the kinds and the blending amounts of the substances contained in chloroprene rubber compositions, the inventors have found that it is possible to achieve the object by blending a particular chloroprene rubber, a carbon black having particular physical properties at a particular rate, and a plasticizer having a particular structure at a particular rate and thus made the present invention.

Specifically, the present invention provides a chloroprene rubber composition comprising:

a chloroprene rubber at least containing a xanthogen-modified chloroprene rubber and/or a mercaptan-modified chloroprene rubber in an amount of 100 parts by mass;

a carbon black having a number-average particle diameter of 70 nm to 600 nm and a DBP oil absorption, as determined by the Oil Absorption A method of JIS-K6221, of 15 ml/100 g to 60 ml/100 g in an amount of 15 to 150 parts by mass, and a plasticizer represented by the following Chemical Formula (1) in an amount of 3 to 30 parts by mass:

(wherein, $R_1$ and $R_2$ each represent an alkyl group having a carbon number of 1 to 7).

The plasticizer contained in the chloroprene rubber composition according to the present invention is not particularly limited, if it is a compound represented by the Chemical Formula (1). However, particularly in the present invention, it is preferably at least one plasticizer selected from dimethyl sebacate, diethyl sebacate, di-n-butyl sebacate, di-n-propyl sebacate, and di-n-pentyl sebacate.

The chloroprene rubber composition according to the present invention can additionally contain an imidazole compound in an amount of 0.1 to 3 parts by mass with respect to 100 parts by mass of the chloroprene rubber.

In this case, the imidazole compound contained in the chloroprene rubber composition according to the present invention is preferably at least one imidazole compound selected from 2-mercaptobenzimidazole and 1-benzyl-2-ethylimidazole.

The chloroprene rubber composition according to the present invention can be used as a vulcanized rubber after it is vulcanized.

Applications of the vulcanized rubber according to the present invention are not particularly limited, but it can be used, for example, as a rubber molded product, a vibration-damping rubber member, an engine mount, and a hose.

The "rubber molded product," as used in the present invention, is a product prepared by filling a chloroprene rubber composition or a mixture of a chloroprene rubber composition with metals, fibers, and others in a mold for vulcanization and molding and vulcanizing it under heat and pressure into a particular shape.

Advantageous Effects of Invention

The chloroprene rubber composition according to the present invention, if used, provides a vulcanized rubber improved in vibration-damping properties under low-temperature environment while preserving the properties such as mechanical properties, weather resistance, and flame resistance. With the properties, the vulcanized rubber obtained can be used as rubber molded products, vibration-damping rubber members, engine mounts, hoses, and others.

Additional aspects and/or advantages of the invention will be set forth in part in the description which follows and, in part, will be obvious from the description, or may be learned by practice of the invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

<1. Chloroprene Rubber Composition>

The chloroprene rubber composition according to the present invention at least comprises (1) a chloroprene rubber, (2) a carbon black, and (3) a plasticizer. It can contain additionally (4) an imidazole compound, (5) other additive or the like. Hereinafter, each component will be described in detail.

(1) Chloroprene Rubber

The chloroprene rubber contained in the chloroprene rubber composition according to the present invention is a homopolymer of 2-chloro-1,3-butadiene (hereinafter, referred to as "chloroprene") or a copolymer of chloroprene with other monomers copolymerizable with chloroprene. The other monomer copolymerizable with chloroprene for use in the invention is not particularly limited, if it does not impair the advantageous effects of the present invention and one or more monomers usable in chloroprene rubber composition may be used as they are arbitrarily selected. Examples thereof include 2,3-dichloro-1,3-butadiene, 1-chloro-1,3-butadiene, styrene, acrylonitrile, methacrylonitrile, isoprene, butadiene, acrylic acid, methacrylic acid, and the esters thereof, and the like.

The polymerization method for preparation of the chloroprene rubber is not particularly limited, if it does not impair the advantageous effects of the present invention and any common polymerization method permitting production of chloroprene rubber can be used, as it is arbitrarily selected. For example, the chloroprene rubber can be prepared by emulsion polymerization of chloroprene monomer in the presence of a polymerization initiator commonly used in chloroprene polymerization according to a commonly-used method.

The polymerization initiator used in the chloroprene polymerization is also not particularly limited, if it does not impair the advantageous effects of the present invention and one or more common polymerization initiators usable for chloroprene rubbers can be used, as they are arbitrarily selected. Examples thereof include potassium persulfate, ammonium persulfate, sodium persulfate, hydrogen peroxide, and organic peroxides such as t-butyl hydroperoxide.

The emulsifier used in the emulsion polymerization is not particularly limited, if it does not impair the advantageous effects of the present invention, and one or more common emulsifier usable for preparation of chloroprene rubbers can be used, as they are arbitrarily selected. Examples thereof include alkali-metal salts of saturated or unsaturated fatty acids having a carbon number of 6 to 22, alkali-metal salts of rosin acids or disproportionated rosin acids, alkali-metal salts of β-naphthalenesulfonic acid formalin condensates and the like.

The polymerization temperature of the chloroprene polymerization is also not particularly limited and can be set to an arbitrary temperature according to the properties of the desired chloroprene rubber, the kinds and blending amounts of the monomers to be polymerized and the like. Particularly in the present invention, the polymerization temperature is preferably set to 0 to 50° C., more preferably to 20 to 50° C.

The final conversion rate of the chloroprene polymerization is also not particularly limited and can be set to an arbitrary value according to the properties of the desired chloroprene rubber, the kinds and blending amounts of the monomers to be polymerized and the like. Particularly in the present invention, the final conversion rate is preferably set in the range of 50 to 95 mass %.

The final conversion rate can be adjusted by terminating the polymerization at a desired conversion rate, for example, by adding a polymerization inhibitor for termination of the polymerization reaction.

The polymerization inhibitor used for termination of the chloroprene polymerization is also not particularly limited, if it does not impair the advantageous effects of the present invention, and one or more common polymerization inhibitors usable in the chloroprene polymerization can be used, as they are selected arbitrarily. Examples thereof include thiodiphenylamine, 4-tertiary butylcatechol, 2,2-methylenebis-4-methyl-6-tertiary butylphenol and the like.

The chloroprene rubber is obtained, as unreacted chloroprene is removed, for example, by steam stripping after termination of the chloroprene polymerization and the polymerization solution is then subjected to pH adjustment and also common steps of freeze solidification, water washing, hot-air drying and others.

The chloroprene rubbers described above are grouped into mercaptan-, xanthogen-, and sulfur-modified rubbers according to the kind of the molecular weight-adjusting agent used.

The chloroprene rubber composition according to the present invention is characterized by containing, in particular, a xanthogen-modified chloroprene rubber and/or a mercaptan-modified chloroprene rubber.

The xanthogen-modified chloroprene rubber is prepared when an alkylxanthogen compound is used as the molecular weight-adjusting agent.

The xanthogen-modified chloroprene rubbers are superior in mechanical properties such as tensile strength and elongation at break, when compared to other modified chloroprene rubbers. It is thus possible to provide a vulcanized rubber improved in mechanical properties such as tensile strength and elongation at break from a chloroprene rubber composition containing a xanthogen-modified chloroprene rubber.

The mercaptan-modified chloroprene rubber is a rubber prepared when an alkylmercaptan such as n-dodecylmercaptan, tert-dodecyloctylmercaptan, and octylmercaptan is used as the molecular weight-adjusting agent.

The mercaptan-modified chloroprene rubbers are superior in adhesiveness to metals, when compared to other modified rubbers. It is thus possible to provide a vulcanized rubber improved in adhesiveness to metals from a chloroprene rubber composition containing a mercaptan-modified chloroprene rubber.

These chloroprene rubbers may be used alone or in combination in the chloroprene rubber composition according to the present invention, it is possible to adjust the properties of the chloroprene rubber composition obtained favorably when they are used in combination.

If both xanthogen- and mercaptan-modified chloroprene rubbers are used in combination, the blending rate is not particularly limited and can be determined arbitrarily according to the desired properties of the chloroprene rubber composition obtained. For example for improvement of the heat resistance of the chloroprene rubber composition, it is preferable to make the blending rate of the mercaptan-modified chloroprene rubber 45 mass % or less, more preferably 40 mass % or less, with respect to 100 mass % of the entire chloroprene rubber.

(2) Carbon Black

The carbon black contained in the chloroprene rubber composition according to the present invention is a reinforcing agent blended for improvement of the mechanical properties of the vulcanized rubber obtained after vulcanization of the chloroprene rubber composition. The chloroprene rubber composition according to the present invention is characterized by containing a carbon black having a number-average particle diameter of 70 nm to 600 nm and a DBP oil absorption, as determined by the Oil Absorption A method of JIS K6221, of 15 ml/100 g to 60 ml/100 g.

Carbon black has been used in chloroprene rubber compositions without its properties being taken into consideration. The inventors have found that the number-average particle diameter and the DBP oil absorption of carbon black are closely correlated to the vibration-damping properties of the chloroprene rubber composition.

The inventors have found that a carbon black having a number-average particle diameter of less than 70 nm leads to deterioration of the vibration-damping properties and thus, it was set to 70 nm or more in the present invention (see Examples below). Alternatively, a carbon black having a number-average particle diameter of more than 600 nm leads to deterioration of the mechanical strength of the rubber. Thus in the present invention, the maximum value of the number-average particle diameter of the carbon black was set to 600 nm.

The inventors have also found that a carbon black having a DBP oil absorption of more than 60 ml/100 g leads to deterioration of the vibration-damping properties and thus, the value was set to 60 ml/100 g or less in the present invention (see Examples below). Alternatively, a carbon black having a DBP oil absorption of less than 15 ml/100 g leads to deterioration of the processability of the rubber and thus, the minimum DBP oil absorption of the carbon black was set to 15 ml/100 g in the present invention.

The carbon black used in the chloroprene rubber composition according to the present invention may be selected and used arbitrarily, if it has a number-average particle diameter in the range of 70 nm to 600 nm, but it is preferable to select a carbon black having a number-average particle diameter in the range of 80 nm to 500 nm.

In addition, the carbon black used in the chloroprene rubber composition according to the present invention may be any carbon black, if it has a DBP oil absorption in the range of 15 ml/100 g to 60 ml/100 g, but it is more preferable to select a carbon black having a DBP oil absorption in the range of 25 ml/100 g to 50 ml/100 g.

The amount of the carbon black blended into the chloroprene rubber composition according to the present invention is characteristically set to 15 to 150 parts by mass with respect to 100 parts by mass of the chloroprene rubber. The inventors have found that, even when a carbon black having a number-average particle diameter and a DBP oil absorption in the ranges above is used, if the blending amount thereof is less than 15 parts by mass with respect to 100 parts by mass of the chloroprene rubber, it leads to deterioration of the mechanical physical properties of the rubber and the vibration-damping properties thereof under low-temperature environment, and thus, the content of the carbon black was set to 15 parts by mass or more in the present invention (see Examples below). The inventors have also found that the vibration-damping properties decline when the content thereof is more than 150 parts by mass and thus, the content was set to 150 parts by mass or less in the present invention (see Examples below).

(3) Plasticizer

The plasticizer is added in the chloroprene rubber composition according to the present invention for improvement of the flexibility of the chloroprene rubber and thus for expression of vibration-damping properties under low-temperature environment. In particular, the present invention is characterized in that a plasticizer represented by Chemical Formula (1) above is used.

Ester-based plasticizers have been used as the plasticizers for chloroprene rubber compositions. It was found in the present invention that the plasticizer represented by the Chemical Formula (1), in particular the carbon number of the R group in Chemical Formula (1), has close relationship with the vibration-damping properties. Specifically, it was found that, when the carbon numbers of $R_1$ and $R_2$ in Chemical Formula (1) are 8 or more, the vibration-damping properties of the product are lower under low-temperature environment and thus, in the present invention, a plasticizer of Chemical Formula (1), wherein the carbon numbers of $R_1$ and $R_2$ are 7 or less, is used (see Examples below).

Typical examples of the plasticizers represented by Chemical Formula (1) above include dimethyl sebacate, diethyl sebacate, di-n-butyl sebacate, di-n-propyl sebacate, di-n-pentyl sebacate and the like, and these compounds can be used alone or in combination of two or more.

Characteristically, the amount of the plasticizer blended into the chloroprene rubber composition according to the present invention is set to 3 to 30 parts by mass with respect to 100 parts by mass of the chloroprene rubber. The inventors have found that, even when a plasticizer represented by Chemical Formula (1) above is used, the vibration-damping properties under low-temperature environment decline if the blending amount thereof is less than 3 parts by mass with respect to 100 parts by mass of the chloroprene rubber and thus, in the present invention, it was set to 3 parts by mass or more (see Examples below). The inventors also found that a content of more than 30 parts by mass leads to deterioration of the mechanical strength of the rubber and thus, it was set to 30 parts by mass or less in the present invention (see Examples below).

The amount of the plasticizer blended into the chloroprene rubber composition according to the present invention is arbitrary, if it is in the range above, but it is more preferably set to 5 to 20 parts by mass particularly in the present invention.

(4) Imidazole Compound

The chloroprene rubber composition according to the present invention may comprise additionally an imidazole compound. The imidazole compound is not an essential component in the chloroprene rubber composition according to the present invention, but blended preferably for improvement of the fatigue durability, such as tension fatigue, of the chloroprene rubber.

The imidazole compound to be blended into the chloroprene rubber composition according to the present invention is not particularly limited in kind, if it does not impair the advantageous effects of the present invention, and one or more common imidazole compounds usable in chloroprene rubbers may be used, as they are arbitrarily selected. Examples thereof include 2-mercaptobenzimidazole, 1-methylimidazole, 1,2-dimethylimidazole, 1-methyl-2-ethylimidazole, 1-benzyl-2-ethylimidazole, 1-benzyl-2-ethyl- 5-methylimidazole, 1-benzyl-2-phenylimidazole, 1-benzyl-2-phenylimidazole trimellitate, 1-aminoethylimidazole, 1-aminoethyl-2-methylimidazole, 1-aminoethyl-2-ethylimidazole, 1-cyanoethyl-2-methylimidazole, 1-cyanoethyl-2-phenylimidazole, 1-cyanoethyl-2-ethyl-4-methylimidazole, 1-cyanoethyl-2-undecylimidazole, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecyl-imidazole trimellitate, 2,4-diamino-6[2'-methylimidazolyl-(1)']ethyl-s-triazine-isocyanurate adducts, 1-cyanoethyl-2-phenyl-4,5-di(cyanoethoxymethyl)imidazole, N-(2-methylimidazolyl-1-ethyl)urea, N,N'-bis-(2-methylimidazolyl-1-ethyl)urea, 1-(cyanoethylaminoethyl)-2-methylimidazole, N,N'-[2-methylimidazolyl-(1)-ethyl]-adipoyldiamide, N,N'-[2-methyl imidazolyl-(1)-ethyl]-dodecanedioyldiamide, N,N'-[2-methylimidazolyl-(1)-ethyl]-eicosanedioyldiamide, 2,4-diamino-6[2'-methylimidazolyl-(1)']-ethyl-s-triazine, 2,4-diamino-6-[2'-undecylimidazolyl-(1)']-ethyl-s-triazine, 1-dodecyl-2-methyl-3-benzylimidazolium chloride, 1,3-dibenzyl-2-methylimidazolium chloride and the like.

Particularly among them, 2-mercaptobenzimidazole or 1-benzyl-2-ethylimidazole is used favorably in the present invention. It is because these compounds vulcanize the chloroprene rubber more efficiently, thus improving the fatigue durability such as tension fatigue.

The amount of the imidazole compound blended into the chloroprene rubber composition according to the present invention is also not particularly limited and may be set to an arbitrary value according to applications. In particular in the present invention, the blending amount thereof is preferably 0.1 to 3 parts by mass, more preferably, 0.3 to 1.5 parts by mass, with respect to 100 parts by mass of the chloroprene rubber. When the blending amount of the imidazole compound is in the range above, it is possible to improve the fatigue durability of the vulcanized rubber obtained, without deterioration in permanent compression set.

(5) Other Additives

The chloroprene rubber composition according to the present invention may contain additionally various additives that are used in conventional chloroprene rubbers, to provide desired physical properties. Examples of the additives include (5-1) fillers and reinforcing agents other than carbon black, (5-2) plasticizers other than the plasticizers represented by Chemical Formula (1), (5-3) processing aids, (5-4) aging inhibitors, (5-5) vulcanizing agents, (5-6) vulcanization accelerator and the like.

(5-1) Fillers and Reinforcing Agents

The filler or the reinforcing agent other than carbon black that can be blended into the chloroprene rubber composition according to the present invention are not particularly limited in kind, if it does not impair the advantageous effects of the present invention, and one or more fillers or reinforcing agents commonly used in chloroprene rubbers can be used, as they are arbitrarily selected. Examples thereof include fillers and reinforcing agents such as silica, clay, talc, and calcium carbonate.

When a filler or a reinforcing agent other than carbon black is blended into the chloroprene rubber composition according to the present invention, the blending amount thereof is also not particularly limited and may be set to an arbitrary value. In particular in the present invention, it is preferably set to a value in the rage of 5 to 100 parts by mass with respect to 100 parts by mass of the chloroprene rubber composition. If it is added in an amount in the range above, it is possible to prevent deterioration of the heat resistance.

(5-2) Plasticizer

The plasticizer other than the plasticizer represented by Chemical Formula (1) above that can be blended into the chloroprene rubber composition according to the present invention is not particularly limited in kind, if it does not impair the advantageous effects of the present invention and is compatible with the chloroprene rubber, and one or more common plasticizers usable in chloroprene rubber may be used, as they are arbitrarily selected. Examples thereof include vegetable oils such as rape seed oil, phthalate-based plasticizers, DOS, DOA, ether-ester-based plasticizers, thio-ether-based plasticizers, aromatic oils, naphthene-based oils and the like.

When the plasticizer other than plasticizer represented by Chemical Formula (1) above is blended into the chloroprene rubber composition according to the present invention, the blending amount thereof is also not particularly limited and may be arbitrarily determined. In particular in the present invention, it is preferably set to a value in the range of 3 to 30 parts by mass with respect to 100 parts by mass of the chloroprene rubber composition. When the blending amount is in the range above, it is possible to satisfy the requirements in vibration-damping properties under low-temperature environment and mechanical physical properties of the rubber.

(5-3) Processing Aids

The processing aid that can be blended into the chloroprene rubber composition according to the present invention is not particularly limited in kind, if it does not impair the advantageous effects of the present invention and one or more common processing aids usable in chloroprene rubbers may be used, as they are arbitrarily selected. Examples thereof include fatty acids such as stearic acid, paraffin-base processing aids such as of polyethylene, fatty acid amides and the like.

When a processing aid is blended in the chloroprene rubber composition according to the present invention, the blending amount thereof is also not particularly limited and may be set to an arbitrary value. In particular in the present invention, it is preferably set to a value in the range of 0.5 to 5 parts by mass with respect to 100 parts by mass of the chloroprene rubber composition. When added in such an amount, it is possible to improve the processability of the rubber without deterioration of the mechanical properties of the rubber.

(5-4) Aging Inhibitor

The aging inhibitor that can be blended into the chloroprene rubber composition according to the present invention is not particularly limited in kind, if it does not impair the advantageous effects of the present invention and one or more common aging inhibitors usable in chloroprene rubbers can be used as they are arbitrarily selected. Examples thereof include amine-based aging inhibitors, imidazole-based aging inhibitors, metal carbamate salts, phenol-based aging inhibitors, waxes and the like. Those effective for improvement in heat resistance among them are amine-based compounds such as 4,4'-bis($\alpha,\alpha$-dimethylbenzyl)diphenylamine and octylated diphenylamines. In particular, 4,4'-bis-($\alpha,\alpha$-dimethylbenzyl)diphenylamine is preferable, as it is more effective in improving heat resistance.

When an aging inhibitor is blended into the chloroprene rubber composition according to the present invention, the blending amount thereof is also not particularly limited and may be set to an arbitrary value. In particular in the present invention, it is preferably set to a value in the range of 0.3 to 10 parts by mass with respect to 100 parts by mass of the chloroprene rubber composition. If an aging inhibitor is added in an amount in the range above, it is possible to improve the heat resistance without migration of the aging inhibitor to the rubber surface.

(5-5) Vulcanizing Agent

The vulcanizing agent that can be blended into the chloroprene rubber composition according to the present invention is not particularly limited in kind, if it does not impair the advantageous effects of the present invention and one or more common vulcanizing agents usable in chloroprene rubbers can be used, as they are arbitrarily selected. In particular in the present invention, use of a metal oxide is preferable. The kind of the metal oxide is also not particularly limited and examples thereof include zinc oxide, magnesium oxide, lead oxide, trilead tetraoxide, diiron trioxide, titanium dioxide, calcium oxide, hydrotalcite and the like.

When a vulcanizing agent is blended into the chloroprene rubber composition according to the present invention, the blending amount thereof is also not particularly limited and may be set to an arbitrary value. In particular in the present invention, the content is preferably set to a value in the range of 3 to 15 parts by mass with respect to 100 parts by mass of the chloroprene rubber composition. When a vulcanizing agent is added in an amount in the range above, it is possible to secure processing safety and obtain a favorable vulcanized product.

(5-6) Vulcanization Accelerator

It is possible to conduct the vulcanization more effectively by using an vulcanization accelerator in combination with the vulcanizing agent in the chloroprene rubber composition according to the present invention. The vulcanization accelerator that can be blended into the chloroprene rubber composition according to the present invention is not particularly limited in kind, if it does not impair the advantageous effects of the present invention and one or more common vulcanization accelerators usable in chloroprene rubbers may be used, as they are arbitrarily selected. Examples thereof include thiourea-, guanidine-, thiuram-, and thiazole-based vulcanization accelerators and the like. Thiourea-based vulcanization accelerators are particularly preferable among them in the present invention. Alternatively, a vulcanization accelerator such as 3-methylthiazolidinethione-2, a mixture of thiadiazole and phenylene dimaleimide, dimethylammonium hydrogen isophthalate, or 1,2-dimercapto-1,3,4-thiadiazole derivative may also be used.

When a vulcanization accelerator is blended into the chloroprene rubber composition according to the present invention, the blending amount thereof is also not particularly limited and may be set to an arbitrary value. In particular in the present invention, it is preferably set to a value in the range of 0.5 to 5 parts by mass with respect to 100 parts by mass of the chloroprene rubber composition. If a vulcanization accelerator is added in an amount in the range above, it is possible to secure processing safety and obtain a vulcanized product superior in mechanical strength.

The chloroprene rubber composition according to the present invention is prepared by kneading the compounds described above at a temperature of not higher than the vulcanization temperature. Any known apparatus may be used, as it is suitably selected, as the apparatus for kneading, if it does not impair the advantageous effects of the present invention. Examples thereof include kneading apparatuses such as a mixer, a Banbury mixer, a kneader mixer, and a two-roll mixer.

<2. Vulcanized Rubber>

The chloroprene rubber composition according to the present invention can be used favorably as vulcanized rubber after vulcanization. The vulcanization method for production of the vulcanized rubber according to the present invention is not particularly limited. For example, the vulcanized rubber can be prepared by molding the composition into a desired shape and then vulcanizing the molded product or by vulcanizing the chloroprene rubber composition into a vulcanized rubber and then molding it into a desired shape.

The methods for molding the chloroprene rubber composition according to the present invention and the vulcanized rubber according to the present invention are also not limited and any known method may be used, as it is arbitrarily selected, if it does not impair the advantageous effects of the present invention. Examples thereof include press molding, extrusion molding, calendering and the like.

The vulcanization temperature during vulcanization of the chloroprene rubber composition according to the present invention may also be set to an arbitrary value, for example, according to the composition of the chloroprene rubber composition and the kind of the vulcanizing agent used. The vulcanization is normally carried out at a temperature preferably in the range of 140 to 220° C. and more preferably in the range of 150 to 180° C. in the present invention.

<3. Applications of Vulcanized Rubber>

The vulcanized rubber according to the present invention, which is superior in vibration-damping properties under low temperature environment while mechanical properties, weather resistance, and flame resistance are preserved, can be used in various applications. The applications of the vulcanized rubber according to the present invention are not particularly limited and it can be used in any application where the properties are useful, as it is arbitrarily selected. In particular in the present invention, it can be used favorably, for example, in rubber molded products, vibration-damping rubber members, engine mounts, and hoses.

EXAMPLES

Hereinafter, the present invention will be described more in detail with reference to Examples and the advantageous effects of the present invention be verified. The Examples below are intended only to provide typical examples of the present invention and the scope of the present invention is not restricted by these Examples.

In the following Examples, studied and compared were the properties of the vulcanized rubbers obtained by vulcanization respectively of the chloroprene rubber compositions of Examples 1 to 19 and Comparative Examples 1 to 12 in the blending composition shown in the following Tables 1 to 4. More specifically, studied and compared were the tensile strength, elongation at break, mechanical properties (such as hardness) under ambient atmosphere, compression set, fatigue by repeated elongation and vibration-damping properties under low-temperature environment of the vulcanized rubbers of Examples 1 to 19 and Comparative Examples 1 to 12.

<Sample Preparation>

Each of the blends prepared respectively according to blending compositions shown in Tables 1 to 4 was kneaded with an 8-inch roll, to give a sheet having a thickness of 2.3 mm.

The sheet obtained was press-vulcanized under a condition of 160° C. for 20 minutes, to give a vulcanized sheet sample having a thickness of 2 mm and a sample for compression set test.

<Characterization>

Each of the samples thus prepared of Examples 1 to 19 and Comparative Examples 1 to 12 was subjected to the tests of (1) tensile strength and elongation at break, (2) physical properties (such as hardness) under ambient atmosphere, (3) compression set, (4) fatigue by repeated elongation, and (5) vibration-damping properties under low-temperature environment. The test methods for the physical properties above are as follows:

(1) Tensile strength and elongation at break

The tensile strength and elongation at break were determined according to JIS K6251.

(2) Hardness under ambient atmosphere

The hardness under ambient atmosphere was determined according to JIS K6253, using a durometer hardness meter.

(3) Compression set

The compression set was determined according to JIG K6262 (test condition: 120° C. for 70 hours).

(4) Tension fatigue

The tension fatigue was determined according to JIS K6270, using No. 3 test specimen at a test temperature of 40° C. and at an elongation percentage of 0 to 100%.

(5) Vibration-damping properties under low-temperature environment

The vibration-damping properties under low-temperature environment were determined under an environment at −20° C. according to JIS K6394, using a cylindrical sample (diameter: 29 mm and height: 12.5 mm) left in an environment at −20° C. for 24 hours. The dynamic multiplication (Kd/Ks), an indicator of the vibration-damping properties, is a value calculated by dividing dynamic spring constant (Kd) by static spring constant (Ks). The static spring constant was determined in the following manner: the sample is compressed once by 28% in the axial direction and additionally by 4% and 12% in the second time. It is calculated from the average of the stresses at compressions of 4% and 12%, when the sample was compressed in that order. Alternatively, the dynamic spring constant was determined under the condition of an initial strain of 10%, a frequency of 100 Hz, and a dynamic strain of ±0.4%.

<Results>

Results are summarized in Tables 1 to 4. Table 1 shows the composition and evaluation results of Examples 1 to 7; Table 2 shows those of Examples 8 to 14; Table 3 shows those of Examples 15 to 19; Table 4 shows those of Comparative Examples 1 to 6; and Table 5 shows those of Comparative Example 7 to 12.

*1 to *10 in each Table indicate the followings and other plasticizers and other compounds used were commercial products.

*1: DCR-66 (registered trademark) (produced by Denki Kagaku Kogyo K.K.)
*2: DCR-36 (registered trademark) (produced by Denki Kagaku Kogyo K.K.)
*3: DCR-40A (registered trademark) (produced by Denki Kagaku Kogyo K.K.)
*4: Thermax N-990 (registered trademark) (produced by Cancarb)
*5: Asahi Thermal FT (registered trademark) (produced by Asahi Carbon Co. Ltd.)
*6: SEAST 3 (registered trademark) (produced by Tokai Carbon Co., Ltd.)
*7: SEAST S (registered trademark) (produced by Tokai Carbon Co., Ltd.)
*8: SEAST SO (registered trademark) (produced by Tokai Carbon Co., Ltd.)
*9: SEAST 116 (registered trademark) (produced by Tokai Carbon Co., Ltd.)
*10: Vulkanol OT (registered trademark) (produced by Bayer)

TABLE 1

|  | Example | | | | | | |
| --- | --- | --- | --- | --- | --- | --- | --- |
|  | 1 | 2 | 3 | 4 | 5 | 6 | 7 |
| Composition | | | | | | | |
| Chloroprene rubber | | | | | | | |
| Xanthogen-modified chloroprene rubber*1 | 100 | 100 | 100 | 100 | 100 | 100 | 100 |
| Mercaptan-modified chloroprene rubber*2 | | | | | | | |
| Sulfur-modified chloroprene rubber*3 | | | | | | | |
| Imidazole compound | | | | | | | |
| 2-Mercaptobenzimidazole | | | | | | | 0.5 |
| 1-Benzyl-2-ethylimidazole | | | | | | | |
| Carbon black (particle diameter, DBP oil absorption) | | | | | | | |
| MT (450 nm, 44 ml/100 g)*4 | 65 | 65 | 65 | 65 | 65 | 65 | 65 |
| FT (80 nm, 28 ml/100 g)*5 | | | | | | | |
| HAF(28 nm, 101 ml/100 g)*6 | | | | | | | |
| SRF(66 nm, 68 ml/100 g)*7 | | | | | | | |
| FEF(43 nm, 115 ml/100 g)*8 | | | | | | | |
| MAF(38 nm, 133 ml/100 g)*9 | | | | | | | |
| Plasticizer | | | | | | | |
| Dimethyl sebacate | 15 | 20 | | | | | 15 |
| Diethyl sebacate | | | 15 | | | | |
| Di-n-butyl sebacate | | | | 15 | | | |
| Di-n-propyl sebacate | | | | | 15 | | |
| Di-n-pentyl sebacate | | | | | | 15 | |
| Di-n-octyl sebacate | | | | | | | |
| Ether-thioether-based plasticizer*10 | | | | | | | |
| Other additives | | | | | | | |
| 4,4'-bis(α,α-dimethylbenzyl)diphenylamine | 1 | 1 | 1 | 1 | 1 | 1 | 1 |
| N-Phenyl-N'-(1,3-dimethylbutyl)-p-phenylenediamine | 1 | 1 | 1 | 1 | 1 | 1 | 1 |
| Stearic acid | 1 | 1 | 1 | 1 | 1 | 1 | 1 |
| ZnO | 5 | 5 | 5 | 5 | 5 | 5 | 5 |
| MgO | 4 | 4 | 4 | 4 | 4 | 4 | 4 |

TABLE 1-continued

|  | Example | | | | | | |
|---|---|---|---|---|---|---|---|
|  | 1 | 2 | 3 | 4 | 5 | 6 | 7 |
| Ethylene thiourea | 1 | 1 | 1 | 1 | 1 | 1 | 1 |
| Tetramethylthiuram disulfide | 0.5 | 0.5 | 0.5 | 0.5 | 0.5 | 0.5 | 0.5 |
| Physical properties | | | | | | | |
| Tensile strength (MPa) | 14.1 | 13.6 | 14.3 | 14.4 | 14.4 | 14.5 | 15.0 |
| Elongation at break (%) | 439 | 425 | 442 | 450 | 455 | 460 | 510 |
| Hardness under ambient atmosphere (Durometer-A) | 55 | 52 | 55 | 55 | 55 | 55 | 55 |
| Compression set (%) | 28 | 30 | 27 | 25 | 25 | 24 | 30 |
| Fatigue by repeated extension ( 10,000) | 91 | 95 | 90 | 91 | 90 | 90 | 100< |
| Vibration-damping properties under low-temperature environment | | | | | | | |
| Ks (N/mm) | 524 | 495 | 528 | 530 | 545 | 560 | 520 |
| Kd/Ks | 4.0 | 3.8 | 4.1 | 4.1 | 4.1 | 4.2 | 4.2 |

TABLE 2

|  | Example | | | | | | |
|---|---|---|---|---|---|---|---|
|  | 8 | 9 | 10 | 11 | 12 | 13 | 14 |
| Composition | | | | | | | |
| Chloroprene rubber | | | | | | | |
| Xanthogen-modified chloroprene rubber*1 | 100 | 100 |  | 55 | 70 | 100 | 100 |
| Mercaptan-modified chloroprene rubber*2 |  |  | 100 | 45 | 30 |  |  |
| Sulfur-modified chloroprene rubber*3 | | | | | | | |
| Imidazole compound | | | | | | | |
| 2-Mercaptobenzimidazole |  | 0.5 |  |  |  |  | 2 |
| 1-Benzyl-2-ethylimidazole |  |  |  |  |  | 0.5 |  |
| Carbon black (particle diameter, DBP oil absorption) | | | | | | | |
| MT (450 nm, 44 ml/100 g)*4 |  |  | 65 | 65 | 65 | 65 | 65 |
| FT (80 nm, 28 ml/100 g)*5 | 65 | 65 |  |  |  |  |  |
| HAF(28 nm, 101 ml/100 g)*6 | | | | | | | |
| SRF(66 nm, 68 ml/100 g)*7 | | | | | | | |
| FEF(43 nm, 115 ml/100 g)*8 | | | | | | | |
| MAF(38 nm, 133 ml/100 g)*9 | | | | | | | |
| Plasticizer | | | | | | | |
| Dimethyl sebacate | 15 | 15 | 15 | 15 | 15 | 15 | 15 |
| Diethyl sebacate | | | | | | | |
| Di-n-butyl sebacate | | | | | | | |
| Di-n-propyl sebacate | | | | | | | |
| Di-n-pentyl sebacate | | | | | | | |
| Di-n-octyl sebacate | | | | | | | |
| Ether-thioether-based plasticizer*10 | | | | | | | |
| Other additives | | | | | | | |
| 4,4'-bis(α,α-dimethylbenzyl)diphenylamine | 1 | 1 | 1 | 1 | 1 | 1 | 1 |
| N-Phenyl-N'-(1,3-dimethylbutyl)-p-phenylenediamine | 1 | 1 | 1 | 1 | 1 | 1 | 1 |
| Stearic acid | 1 | 1 | 1 | 1 | 1 | 1 | 1 |
| ZnO | 5 | 5 | 5 | 5 | 5 | 5 | 5 |
| MgO | 4 | 4 | 4 | 4 | 4 | 4 | 4 |
| Ethylene thiourea | 1 | 1 | 1 | 1 | 1 | 1 | 1 |
| Tetramethylthiuram disulfide | 0.5 | 0.5 | 0.5 | 0.5 | 0.5 | 0.5 | 0.5 |
| Physical properties | | | | | | | |
| Tensile strength (MPa) | 14.4 | 14.9 | 14.4 | 14.3 | 14.2 | 15.1 | 16.2 |
| Elongation at break (%) | 452 | 485 | 430 | 441 | 453 | 518 | 510 |
| Hardness under ambient atmosphere (Durometer-A) | 55 | 55 | 55 | 55 | 55 | 55 | 55 |
| Compression set (%) | 28 | 31 | 25 | 26 | 27 | 30 | 34 |
| Fatigue by repeated extension ( 10,000) | 88 | 100< | 87 | 89 | 90 | 100< | 100< |
| Vibration-damping properties under low-temperature environment | | | | | | | |
| Ks (N/mm) | 530 | 520 | 530 | 520 | 525 | 520 | 515 |
| Kd/Ks | 4.1 | 4.3 | 4.3 | 4.2 | 4.2 | 4.2 | 4.4 |

TABLE 3

| | Example | | | | |
|---|---|---|---|---|---|
| | 15 | 16 | 17 | 18 | 19 |
| Composition | | | | | |
| Chloroprene rubber | | | | | |
| Xanthogen-modified chloroprene rubber*1 | 100 | 100 | 100 | 100 | 100 |
| Mercaptan-modified chloroprene rubber*2 | | | | | |
| Sulfur-modified chloroprene rubber*3 | | | | | |
| Imidazole compound | | | | | |
| 2-Mercaptobenzimidazole | 0.1 | 3 | 1 | | |
| 1-Benzyl-2-ethylimidazole | | | | | |
| Carbon black (particle diameter, DBP oil absorption) | | | | | |
| MT (450 nm, 44 ml/100 g)*4 | 65 | 65 | 15 | 150 | 65 |
| FT (80 nm, 28 ml/100 g)*5 | | | | | |
| HAF (28 nm, 101 ml/100 g)*6 | | | | | |
| SRF (66 nm, 68 ml/100 g)*7 | | | | | |
| FEF (43 nm, 115 ml/100 g)*8 | | | | | |
| MAF (38 nm, 133 ml/100 g)*9 | | | | | |
| Plasticizer | | | | | |
| Dimethyl sebacate | 15 | 15 | 15 | 30 | 3 |
| Diethyl sebacate | | | | | |
| Di-n-butyl sebacate | | | | | |
| Di-n-propyl sebacate | | | | | |
| Di-n-pentyl sebacate | | | | | |
| Di-n-octyl sebacate | | | | | |
| Ether-thioether-based plasticizer*10 | | | | | |
| Other additives | | | | | |
| 4,4'-bis(α,α-dimethylbenzyl)diphenylamine | 1 | 1 | 1 | 1 | 1 |
| N-Phenyl-N'-(1,3-dimethylbutyl)-p-phenylenediamine | 1 | 1 | 1 | 1 | 1 |
| Stearic acid | 1 | 1 | 1 | 1 | 1 |
| ZnO | 5 | 5 | 5 | 5 | 5 |
| MgO | 4 | 4 | 4 | 4 | 4 |
| Ethylene thiourea | 1 | 1 | 1 | 1 | 1 |
| Tetramethylthiuram disulfide | 0.5 | 0.5 | 0.5 | 0.5 | 0.5 |
| Physical properties | | | | | |
| Tensile strength (MPa) | 14.5 | 17.0 | 13.5 | 12.6 | 18.5 |
| Elongation at break (%) | 450 | 580 | 750 | 420 | 510 |
| Hardness under ambient atmosphere (Durometer-A) | 55 | 57 | 40 | 70 | 62 |
| Compression set (%) | 29 | 38 | 445 | 58 | 24 |
| Fatigue by repeated extension (10,000) | 95 | 100< | 100< | 70 | 85 |
| Vibration-damping properties under low-temperature environment | | | | | |
| Ks (N/mm) | 523 | 500 | 280 | 682 | 592 |
| Kd/Ks | 4.1 | 4.5 | 3.5 | 4.9 | 4.4 |

TABLE 4

| | Comparative Example | | | | | |
|---|---|---|---|---|---|---|
| | 1 | 2 | 3 | 4 | 5 | 6 |
| Composition | | | | | | |
| Chloroprene rubber | | | | | | |
| Xanthogen-modified chloroprene rubber*1 | 100 | 100 | 100 | 100 | 100 | 100 |
| Mercaptan-modified chloroprene rubber*2 | | | | | | |
| Sulfur-modified chloroprene rubber*3 | | | | | | |
| Imidazole compound | | | | | | |
| 2-Mercaptobenzimidazole | | | | | | |
| 1-Benzyl-2-ethylimidazole | | | | | | |
| Carbon black (particle diameter, DBP oil absorption) | | | | | | |
| MT (450 nm, 44 ml/100 g)*4 | 65 | 65 | 10 | 210 | | |
| FT (80 nm, 28 ml/100 g)*5 | | | | | | |
| HAF (28 nm, 101 ml/100 g)*6 | | | | | 65 | |
| SRF (66 nm, 68 ml/100 g)*7 | | | | | | 65 |
| FEF (43 nm, 115 ml/100 g)*8 | | | | | | |
| MAF (38 nm, 133 ml/100 g)*9 | | | | | | |

TABLE 4-continued

|  | Comparative Example | | | | | |
|---|---|---|---|---|---|---|
|  | 1 | 2 | 3 | 4 | 5 | 6 |
| Plasticizer | | | | | | |
| Dimethyl sebacate | 1 | 35 | 3 | 30 | 15 | 15 |
| Diethyl sebacate | | | | | | |
| Di-n-butyl sebacate | | | | | | |
| Di-n-propyl sebacate | | | | | | |
| Di-n-pentyl sebacate | | | | | | |
| Di-n-octyl sebacate | | | | | | |
| Ether-thioether-based plasticizer*10 | | | | | | |
| Other additives | | | | | | |
| 4,4'-bis(α,α-dimethylbenzyl)diphenylamine | 1 | 1 | 1 | 1 | 1 | 1 |
| N-Phenyl-N'-(1,3-dimethylbutyl)-p-phenylenediamine | 1 | 1 | 1 | 1 | 1 | 1 |
| Stearic acid | 1 | 1 | 1 | 1 | 1 | 1 |
| ZnO | 5 | 5 | 5 | 5 | 5 | 5 |
| MgO | 4 | 4 | 4 | 4 | 4 | 4 |
| Ethylene thiourea | 1 | 1 | 1 | 1 | 1 | 1 |
| Tetramethylthiuram disulfide | 0.5 | 0.5 | 0.5 | 0.5 | 0.5 | 0.5 |
| Physical properties | | | | | | |
| Tensile strength (MPa) | 16.5 | 12.3 | 18.5 | 9.8 | 18.3 | 13.8 |
| Elongation at break (%) | 396 | 450 | 724 | 320 | 408 | 453 |
| Hardness under ambient atmosphere (Durometer-A) | 61 | 45 | 45 | 89 | 67 | 65 |
| Compression set (%) | 21 | 45 | 20 | 85 | 32 | 34 |
| Fatigue by repeated extension (10,000) | 80 | 100< | 80 | 30 | 55 | 74 |
| Vibration-damping properties under low-temperature environment | | | | | | |
| Ks (N/mm) | 540 | 480 | 615 | 982 | 760 | 740 |
| Kd/Ks | 5.8 | 3.8 | 5.3 | 6.6 | 5.2 | 5.1 |

TABLE 5

|  | Comparative Example | | | | | |
|---|---|---|---|---|---|---|
|  | 7 | 8 | 9 | 10 | 11 | 12 |
| Composition | | | | | | |
| Chloroprene rubber | | | | | | |
| Xanthogen-modified chloroprene rubber*1 | 100 | 100 | 100 | | 100 | 100 |
| Mercaptan-modified chloroprene rubber*2 | | | | | | |
| Sulfur-modified chloroprene rubber*3 | | | | 100 | | |
| Imidazole compound | | | | | | |
| 2-Mercaptobenzimidazole | 0.5 | | | | | |
| 1-Benzyl-2-ethylimidazole | | | | | | |
| Carbon black (particle diameter, DBP oil absorption) | | | | | | |
| MT (450 nm, 44 ml/100 g)*4 | | | | 65 | 65 | 65 |
| FT (80 nm, 28 ml/100 g)*5 | | | | | | |
| HAF(28 nm, 101 ml/100 g)*6 | | | | | | |
| SRF(66 nm, 68 ml/100 g)*7 | 65 | | | | | |
| FEF(43 nm, 115 ml/100 g)*8 | | 65 | | | | |
| MAF(38 nm, 133 ml/100 g)*9 | | | 65 | | | |
| Plasticizer | | | | | | |
| Dimethyl sebacate | 15 | 15 | 15 | 15 | | |
| Diethyl sebacate | | | | | | |
| Di-n-butyl sebacate | | | | | | |
| Di-n-propyl sebacate | | | | | | |
| Di-n-pentyl sebacate | | | | | | |
| Di-n-octyl sebacate | | | | | 15 | |
| Ether-thioether-based plasticizer*10 | | | | | | 15 |
| Other additives | | | | | | |
| 4,4'-bis(α,α-dimethylbenzyl)diphenylamine | 1 | 1 | 1 | 1 | 1 | 1 |
| N-Phenyl-N'-(1,3-dimethylbutyl)-p-phenylenediamine | 1 | 1 | 1 | 1 | 1 | 1 |
| Stearic acid | 1 | 1 | 1 | 1 | 1 | 1 |
| ZnO | 5 | 5 | 5 | 5 | 5 | 5 |
| MgO | 4 | 4 | 4 | 4 | 4 | 4 |
| Ethylene thiourea | 1 | 1 | 1 | 1 | 1 | 1 |
| Tetramethylthiuram disulfide | 0.5 | 0.5 | 0.5 | 0.5 | 0.5 | 0.5 |

TABLE 5-continued

|  | Comparative Example | | | | | |
|---|---|---|---|---|---|---|
|  | 7 | 8 | 9 | 10 | 11 | 12 |
| Physical properties | | | | | | |
| Tensile strength (MPa) | 17.1 | 17.2 | 18.0 | 21.0 | 14.9 | 15.2 |
| Elongation at break (%) | 480 | 465 | 420 | 530 | 445 | 446 |
| Hardness under ambient atmosphere (Durometer-A) | 65 | 65 | 67 | 52 | 55 | 55 |
| Compression set (%) | 38 | 27 | 31 | 90 | 29 | 30 |
| Fatigue by repeated extension ( 10,000) | 100< | 72 | 65 | 100< | 70 | 73 |
| Vibration-damping properties under low-temperature environment | | | | | | |
| Ks (N/mm) | 735 | 750 | 761 | 830 | 560 | 580 |
| Kd/Ks | 5.5 | 5.2 | 5.2 | 5.0 | 5.3 | 5.5 |

Tables 1 to 3 confirm that the vulcanized rubbers of Examples 1 to 19 are superior in vibration-damping properties under low-temperature environment, compared to those of Comparative Examples, without deterioration of the tensile strength, elongation at break, mechanical properties (such as hardness) under ambient atmosphere, permanent compression set, and the tension fatigue.

When the kind of the chloroprene rubber is considered, the vulcanized rubber of Comparative Example 10, which contained a sulfur-modified chloroprene rubber, was inferior in compression set and also not favorable in vibration-damping properties under low-temperature environment.

When the number-average particle diameter of the carbon black is considered, the vulcanized rubbers of Comparative Examples 5 to 9, which contained a carbon black having a number-average particle diameter of less than 70 nm, were inferior in vibration-damping properties under low-temperature environment.

When the DBP oil absorption of the carbon black, as determined by the Oil Absorption A method of JIS-K6221, is considered, the vulcanized rubbers of Comparative Examples 5 to 9, which contained a carbon black having a DBP oil absorption of more than 60 ml/100 g, were inferior in vibration-damping properties under low-temperature environment.

When the blending amount of carbon black is considered, the vulcanized rubber of Comparative Example 3, which contained a carbon black having a number-average particle diameter in the range of 70 nm to 600 nm and a DBP oil absorption in the range of 15 ml/100 g to 60 ml/100 g in a blending amount of less than 15 parts by mass, was inferior in vibration-damping properties under low-temperature environment.

On the contrary, the vulcanized rubber of Comparative Example 4, which contained a carbon black in a blending amount of more than 150 parts by mass even if having a number-average particle diameter in the range of 70 nm to 600 nm and a DBP oil absorption in the range of 15 ml/100 g to 60 ml/100 g, had a low tensile strength and was also inferior in vibration-damping properties under low-temperature environment.

When the kind of the plasticizer is considered, the vulcanized rubber of Comparative Example 12, which contained an ether/thioether-based plasticizer (trade name: "Vulkanol OT" (registered trademark)), was inferior in vibration-damping properties under low-temperature environment.

When the structure of the plasticizer is considered, the vulcanized rubber of Comparative Example 11, which contained di-n-octyl sebacate, a plasticizer represented by Chemical Formula (1), wherein the group R has a carbon number of 8, was inferior in vibration-damping properties under low-temperature environment.

When the blending amount of the plasticizer is considered, the vulcanized rubber of Comparative Example 1, which contained a plasticizer represented by Chemical Formula (1), wherein the group R has a carbon number of 1 to 7 in a blending amount of less than 3 parts by mass, was inferior in vibration-damping properties under low-temperature environment.

On the contrary, the vulcanized rubber of Comparative Example 2, which contained a plasticizer represented by Chemical Formula (1), wherein the group R has a carbon number of 1 to 7, in a blending amount of more than 30 parts by mass, was found to be superior in vibration-damping properties under low-temperature environment, but inferior in tensile strength and compression set.

When the vulcanized rubbers of Examples are compared, it was found that the vulcanized rubbers of Example 7, 9, and 13 to 17, which contains additionally an imidazole compound in an amount in the range of 0.1 to 3 parts by mass, were improved in their fatigue durability, while the compression set thereof remained unreduced.

The results above demonstrate that, in order to further improve the vibration-damping properties under low-temperature environment without deterioration of the mechanical properties, permanent compression set, and tension fatigue of the chloroprene rubber, it is needed to specify the kind of the chloroprene rubber, the physical properties of carbon black, and the structure of the plasticizer blended into the chloroprene rubber composition and also to set the blending amounts thereof into certain ranges.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:
1. A chloroprene rubber composition comprising:
   a chloroprene rubber comprising a xanthogen-modified chloroprene rubber and/or a mercaptan-modified chloroprene rubber in an amount of 100 parts by mass;
   a carbon black having a number-average particle diameter of 70 nm to 600 nm and a DBP oil absorption, as determined by the Oil Absorption A method of JIS-K6221, of 15 ml/100 g to 60 ml/100 g in an amount of 15 to 150 parts by mass; and a plasticizer represented by the following Chemical Formula (1) in an amount of 3 to 30 parts by mass:

$$R_1COO-(CH_2)_8-COOR_2 \qquad (1)$$

(wherein, $R_1$ and $R_2$ each represent an alkyl group having a carbon number of 1 to 5).

2. The chloroprene rubber composition according to claim 1, containing at least one plasticizer is at least one plasticizer selected from dimethyl sebacate, diethyl sebacate, di-n-butyl sebacate, di-n-propyl sebacate, and di-n-pentyl sebacate.

3. The chloroprene rubber composition according to claim 1, further containing at least one imidazole compound in an amount of 0.1 to 3 parts by mass with respect to 100 parts by mass of the chloroprene rubber.

4. The chloroprene rubber composition according to claim 3, wherein at least one imidazole compound is at least one imidazole compound selected from 2-mercaptobenzimidazole, and 1-benzyl-2-ethylimidazole.

5. A vulcanized rubber, prepared by vulcanization of the chloroprene rubber composition according to claim 1.

6. A rubber molded product, prepared by vulcanization of the chloroprene rubber according to claim 5 and molding the final product.

7. A vibration-damping rubber member, prepared by vulcanization of the chloroprene rubber according to claim 5 and forming the vibration-damping rubber member.

8. An engine mount, prepared by vulcanization of the chloroprene rubber according to claim 5, and forming the engine mount.

9. A hose, prepared by vulcanization of the chloroprene rubber according to claim 5, and forming the hose.

10. The chloroprene rubber composition according to claim 2, further comprising an imidazole compound in an amount of 0.1 to 3 parts by mass with respect to 100 parts by mass of the chloroprene rubber.

11. A vulcanized rubber, prepared by vulcanization of the chloroprene rubber composition according to claim 2.

12. A vulcanized rubber, prepared by vulcanization of the chloroprene rubber composition according to claim 3.

13. A vulcanized rubber, prepared by vulcanization ofthe chloroprene rubber composition according to claim 4.

* * * * *